Oct. 14, 1941.    L. E. McGLAUGHLIN    2,259,073
AUTOMATIC BROILER
Filed July 3, 1940    2 Sheets-Sheet 1
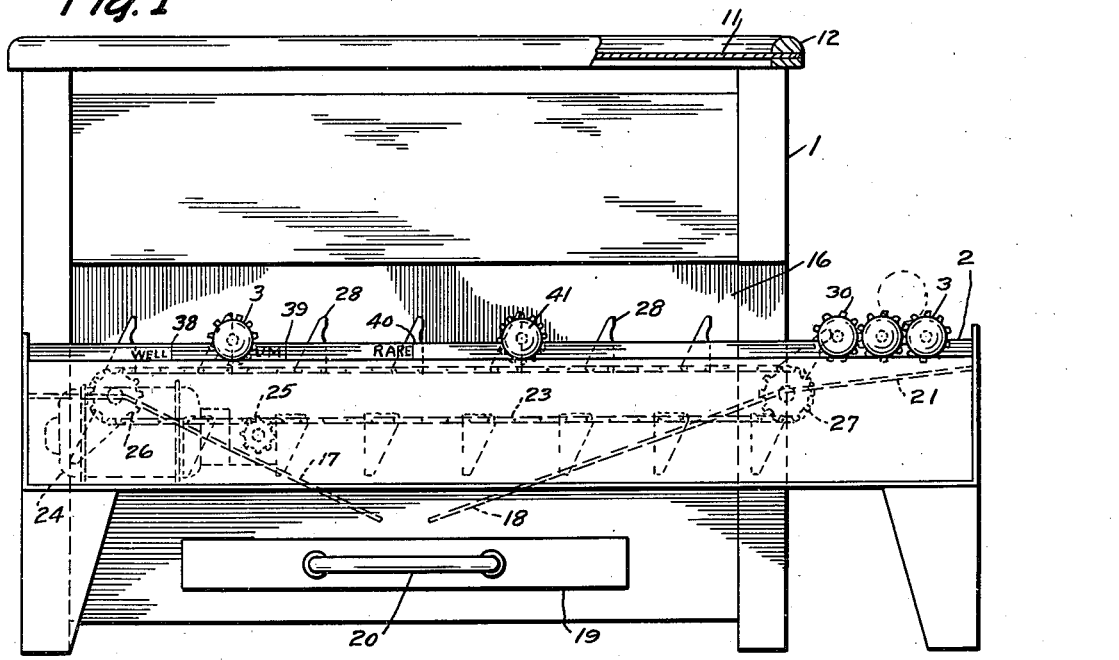
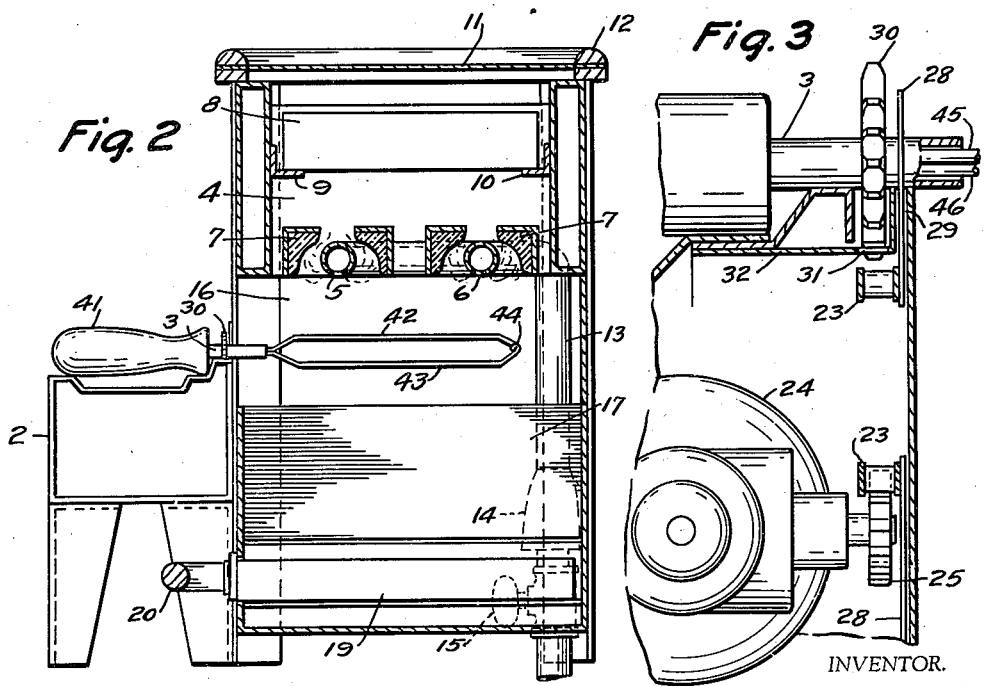
INVENTOR.
Louis E. McGlaughlin
BY James Harrison Bowen
ATTORNEY.

Oct. 14, 1941.                L. E. McGLAUGHLIN                2,259,073
                                AUTOMATIC BROILER
                               Filed July 3, 1940            2 Sheets—Sheet 2
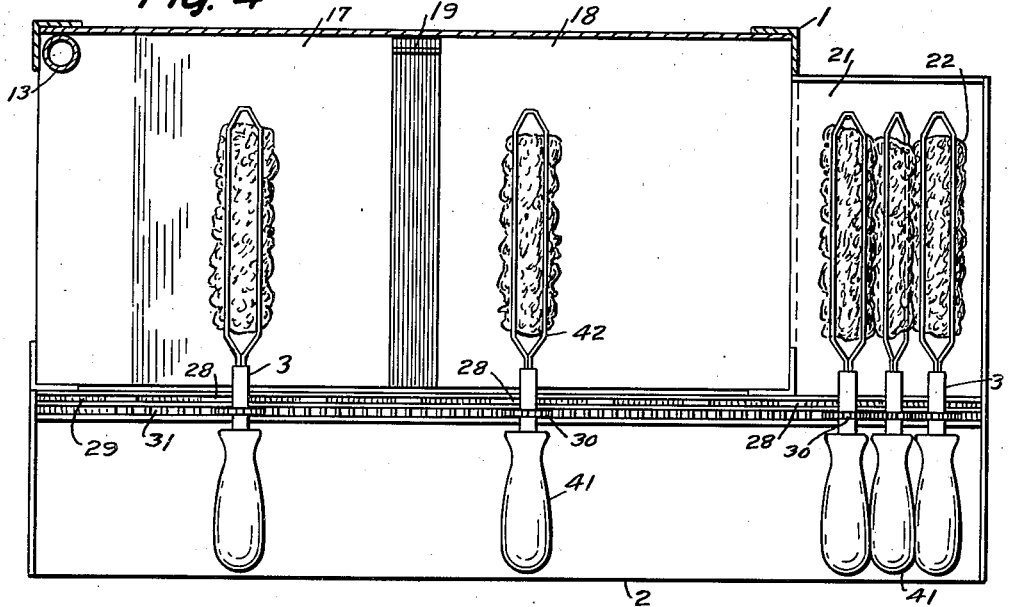
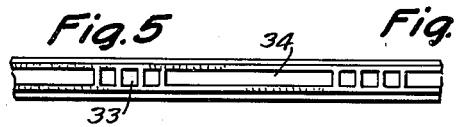
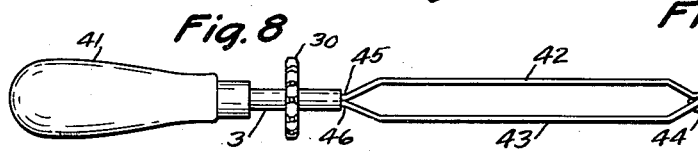
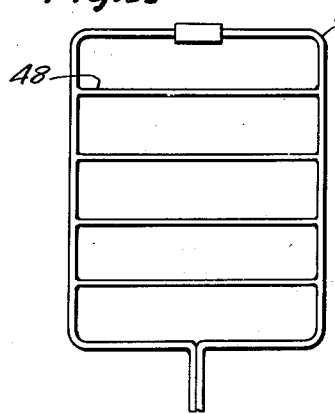
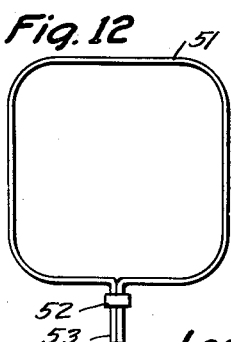
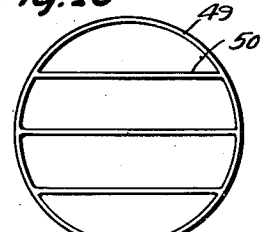
INVENTOR.
Louis E. McGlaughlin
BY James Harrison Bowen
ATTORNEY.

Patented Oct. 14, 1941

2,259,073

UNITED STATES PATENT OFFICE 2,259,073

AUTOMATIC BROILER

Louis E. McGlaughlin, New York, N. Y.

Application July 3, 1940, Serial No. 343,840

13 Claims. (Cl. 53—5)

The purpose of this invention is to provide a broiler or heater in which products may be placed in which the products are conveyed under an open fire until cooked and then deposited over an open drain.

The invention is a broiler having a fire suspended above an open area with a conveyor at the front, and supporting devices for holding products to be broiled adapted to be carried across the broiler under the fire and at the same time turned to expose all sides of the product to the fire.

Products are normally broiled under burners in enclosed ovens and on hot plates or grills, and as these require opening and closing, and are dependent upon an attendant for timing, they are not suitable for road stands, diners, and the like, or especially where continuous service is desired.

The object of this invention is, therefore, to provide an automatic broiler in which products may be placed that will automatically broil the product a predetermined period of time.

Another object is to provide a broiler which broils products in the open.

Another object is to provide a broiler particularly adapted for hamburgers and the like which turns the hamburger while broiling.

A further object is to provide means for conveying products under an open fire which operates independent of the device in which the fire is positioned.

And a still further object of the invention is to provide a device for broiling hamburg, frankfurters, chopped meat in roll form, patties, kabobs, cube steaks, and sausage, automatically, which is of a simple and economical construction.

With these ends in view the invention embodies a burner with downwardly reflecting refractory elements suspended in a housing with an opening extending therethrough, a drip pan below the opening, a stand having a conveyor with extending fingers through the upper surface, and holders adapted to be positioned on the stand to be engaged by said fingers for moving the holders along the stand, and sprockets on the holders engaging a rack in the stand for rotating the holders as they are moved by the fingers, said holders adapted to be opened and closed to remove and replace products.

Other features and advantages of the invention will appear from the following description taken in connection with the drawings, wherein:

Figure 1 is a view showing a front elevation of the broiler with part broken away.

Figure 2 shows a cross section through the broiler.

Figure 3 is a detail showing a section through the chain and track with a portion of a holder and a sprocket thereon.

Figure 4 is sectional plan through the horizontal opening through the broiler.

Figure 5 is a detail showing a rack with combinations of slots and openings whereby the holder only turns at intervals.

Figure 6 shows an S trigger that may be used in place of the sprocket.

Figure 7 is a detail similar to that shown in Figure 5 in which bars only are used at intervals.

Figure 8 shows a side elevation of a holder.

Figure 9 is a section through the holder looking toward the handle.

Figure 10 is a plan view of the holder with the handle omitted.

Figure 11 shows a holder of an alternate design.

Figure 12 shows a holder of another alternate design.

Figure 13 shows a round holder or another design.

In the drawings the broiler is shown as it may be made wherein numeral 1 indicates the broiler housing, numeral 2 the conveyor frame, and numeral 3 a holder.

The housing 1 is made as shown in Figures 1, 2, and 4, with an upper burner section 4 having burners formed with tubes 5 and 6 and radiant refractories 7 at the sides of the tubes. Above the burners are baffle refractories 8 formed of fire bricks resting upon angles 9 and 10, and above these elements is a plate 11 in a frame 12, which may be used for toasting rolls or for any purpose. The burner is supplied with gas or other fuel through a pipe 13 and in the lower part of the pipe is a venturi 14 and below this is a valve 15 by which the heat may be controlled so that the broiler is adapted for different products. The flame from the burners will engage the refractories 7 which will absorb and reflect the heat downward toward products that may be held in the holders 3 in an opening 16 extending laterally through the broiler.

The opening 16 is below the burner and below the opening are sloping surfaces 17 and 18 for catching the drip which runs downward into a drip pan 19 that is in the form of a drawer and may be removed by a handle 20. An additional drip plate 21 may also be provided at the end of the housing for catching the drip from finished products as indicated at 22 in Figure 4, and this drains into the pan 19 over the surface 18.

The conveyor frame 2 is formed to be positioned directly in front of the housing 1, and this has a chain 23 driven by a motor 24 with a sprocket 25, and traveling over sprockets 26 and 27, and at spaced intervals on this chain are fingers 28 which extend upward through a groove 29 in the upper surface of the frame and are adapted to engage the shanks of the holders 3 as shown in Figures 1 and 4 to move the holders through the opening 16, and as the holders are moved sprockets 30 on the holders, traveling in a rack 31 formed in a plate 32, cause the holders to rotate thereby turning the holders and products held therein so that all parts of the products will be exposed to the fire. The rack 31 may be continuous as shown in Figure 4, or may have openings, only at intervals, or teeth only at intervals as shown in Figure 5, in which groups of the teeth 33 are spaced by open slots 34, so that the holders will only turn when the sprockets engage the teeth 33, or as in Figure 7, when they engage bars 35 in open slots 36. The sprockets may also be replaced by S shaped triggers 37 as shown in Figure 6, or any suitable engaging means may be used.

The upper surface of the frame 2 may be marked as shown at 38, 39, and 40, to indicate that products may be placed at these points to obtain well done, medium, or rare products, respectively.

The holders 3 comprise tubular shanks with handles 41 and product holding devices formed by frames 42 and 43 hinged at the point 44 and these are provided with ends 45 and 46 adapted to be slidably held in the shanks. In loading the frames are withdrawn from the shanks and opened, and after a product has been placed on one side of the frame the other side is closed upon it and then all of the ends are slid into the shank, and the holder is then ready to be placed in the broiler. These may be wrapped in waxed paper and kept in a cool place until used.

The holders described and shown in Figures 2, 4, and 8, are particularly adapted for hamburgers in roll form, as may be used in long rolls, however, it will be understood that these may be made for patties, sausage, kabobs, steak, ham, chicken and the like, and these may be rectangular as shown in Figure 11, square as shown in Figure 12, or round as shown in Figure 13, or of any shape. In Figure 11 the device is formed with frames 47 having transverse wires 48, and in Figure 13 it has loops 49 and wires 50. In Figure 12 it is formed with two frames 51 held together by a ring 52 slidable on shanks 53 and it will be noted that the ring may be moved backward to open the rings to insert products therein, and then moved outward toward the rings or loops to grip the products while broiling.

It will be understood that changes may be made in the construction without departing from the spirit of the invention. One of which changes may be in the use of a burner of any other type or design, another may be in the use of other means for holding the products, another may be in the use of other means for moving the products through the broiler, and still another may be in the use of the device for any other purpose.

The construction will be readily understood from the foregoing description. In use the broiler may be provided as shown and described and with the burner burning products may be placed in the holding devices, and these holders with the products therein may be wrapped and stored and when they are desired for use the wrappers may be removed and the holders placed on the frame 2 with the ends extending into the opening 16 of the broiler and as the chain moves the fingers thereon will engage the shanks of the holders and slowly move them along and as these move the sprockets thereon will engage the rack and turn the products, and then when they reach the end of the broiler one will move the other to positions over the drip pan 21 and should this be filled they will rise upward as indicated by the dotted lines; however they will normally be used as fast as they reach the far end of the broiler.

Having thus fully described the invention what I claim as new and desire to secure by Letters Patent, is:

1. A broiler comprising a housing having a burner with a substantially unobstructed horizontal opening adjacent the burner, and holding means conveying products to be broiled through the opening, with the holding means extending through a continuous opening in the side wall of the housing.

2. A broiler as described in claim 1, having means engaging the holders for turning the products as they pass through the opening.

3. In combination with the broiler as described in claim 1, holders for the products having handles and sprockets with the sprockets positioned to travel over a rack for turning the holders, characterized by an independent frame, positioned in front of said housing, supporting the holders at one end.

4. In combination with a broiler as described in claim 1, holders for the products having handles and frames characterized in that the frames are slidable in the handles.

5. A broiler as described in claim 1, in which the conveying means comprises a separate frame, an endless chain, fingers on the said chain, and means rotating the chain.

6. A broiler as described in claim 1, characterized in that the conveying means comprises a separate frame positioned in front of the housing, said frame adapted to support the said products and having slowly moving fingers moving the said products.

7. A broiler as described in claim 1, characterized in that the conveying means comprises a separate frame with slowly traveling fingers and product holding means adapted to be moved by said fingers.

8. An automatic broiler toaster or the like comprising product holders, a frame supporting said holders in substantially a horizontal position, means moving said holders along said frame, and means turning said holders as they are moved, characterized in that the supporting frame is independent and positioned at one side of the broiler with the said product holders extending through a continuous opening in the side wall of the broiler into the broiler.

9. In combination with a frame as described in claim 8, a burner positioned above said holders.

10. A broiling device as described in claim 8, having a heater, and characterized in that the holders are turned periodically.

11. An automatic broiler, toaster, or the like, comprising product holders, a frame supporting said holders in substantially a horizontal position, and means moving said holders along said frame, characterized in that the supporting frame is independent of and positioned adjacent the broiler with the said product holders extending beyond the frame, and adapted to subject the products therein to the heat of the broiler.

12. An automatic broiler as described in claim 11, further characterized by means turning the product holders.

13. An automatic broiler as described in claim 11, further characterized by means turning the product holders periodically.

LOUIS E. McGLAUGHLIN.